United States Patent Office 3,362,487
Patented Jan. 9, 1968

3,362,487
CONTROL FOR A HYDRAULICALLY ACTUATED CHOKE IN A DRILLING MUD FLOW LINE
Larry M. Lindsey, Fort Worth, Tex., assignor, by mesne assignments, to Swaco, Inc., Fort Worth, Tex., a corporation of Texas
Filed May 3, 1966, Ser. No. 547,207
14 Claims. (Cl. 175—38)

ABSTRACT OF THE DISCLOSURE

A control for a choke having a hydraulic actuator for varying the choke orifice in a drilling mud flow line from a well, said control comprising a hydraulic system for actuating said hydraulic actuator and a pneumatic system for operating said hydraulic system, the hydraulic system including a fluid reservoir, a pump for delivering fluid under pressure from the reservoir to the hydraulic actuator, a by-pass for returning fluid from the pump to the reservoir, and a normally closed fluid pressure responsive relief valve provided in the by-pass, the pneumatic system including a compressed air supply, a compressed air motor connected to the air supply and drivingly connected to the pump, and a manually adjustable regulator between the air supply and the air motor whereby to control hydraulic fluid pressure delivered by the pump. The apparatus also includes automatic controls responsive selectively to drilling mud pressure in the well casing or in a standpipe to cause the hydraulic actuator to increase the choke orifice in response to a well pressure in excess of a preselected pressure and to decrease the choke orifice in response to a well pressure below the preselected pressure.

---

This invention relates to new and useful improvements in the art of controlling the flow of drilling mud from wells, and in particular the invention concerns itself with controlling the operation of a hydraulically actuated, variable choke interposed in the flow line of mud from a well casing to mud pits.

As such, the control apparatus of the invention is especially suitable for use with a hydraulically actuated, variable choke of the general type disclosed in a pending patent application Ser. No. 524,061, filed Feb. 1, 1966, by Phil H. Griffin III, although it is to be understood that the control apparatus of the present invention has general utility which does not restrict its use to a hydraulic choke of a particular type.

The principal object of the invention is to provide a choke control which is entirely automatic in operation by being responsive to variations in the pressure of mud in a well, the control causing the choke to throttle the flow of mud to the pits when the mud pressure in the well falls and, conversely, increasing the mud flow when the pressure rises, so that as a result the mud pressure in the well may be maintained substantially constant. The control apparatus of the invention is capable of sensing and responding to pressure of mud either in the casing or in the standpipe of the well, and includes controller means adjustable to a predetermined mud pressure at either the casing or the standpipe to control the operation of the choke. In conditions where the well bore has been invaded by foreign fluids such as water or gas, the automatic control of the invention may be adjusted to compensate for differences between pressure in the well formation and pressure of mud in the well, so as to permit the foreign fluids to be pumped out without the danger of a blowout.

Another feature of the invention resides in its use of two inter-dependent systems for controlling the choke, namely, a hydraulic system which actuates the choke itself, and a pneumatic system which operates the hydraulic system, the arrangement being such that delays between sensing of changes in mud pressure and adjustment of the choke are substantially minimized.

Another feature of the invention involves the provision of means for manual control of actuation of the choke when so desired, independently of the automatic control outline above.

With the foregoing more important object and features in view and such other objects and features as may become apparent as this specification proceeds, the invention will be understood from the following description taken in conjunction with the accompanying drawings, wherein like characters of reference are used to designate like parts, and wherein.

Figure 1:
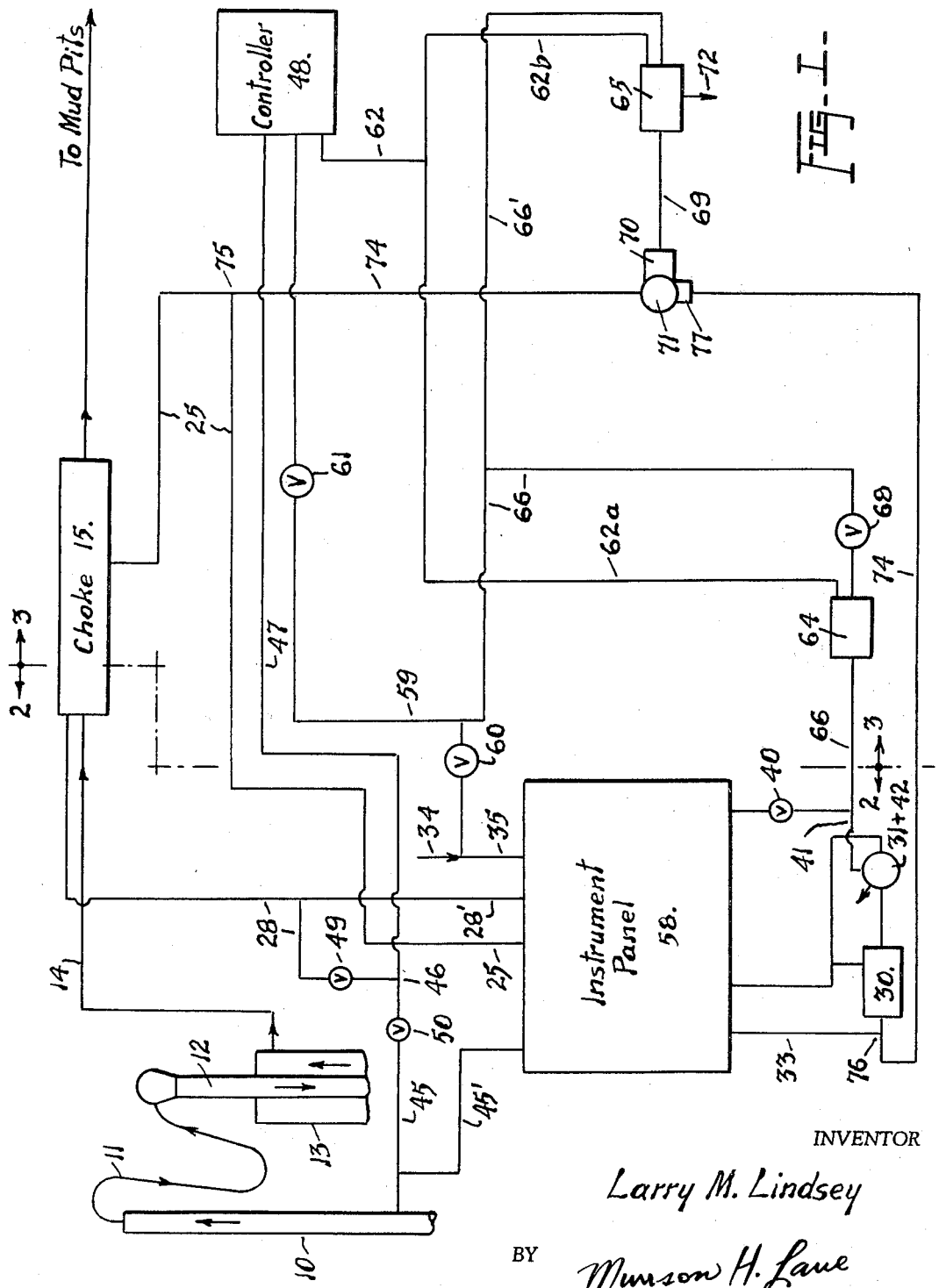
FIG. 1 is a diagrammatic view showing the control apparatus of the invention.
Figure 2:
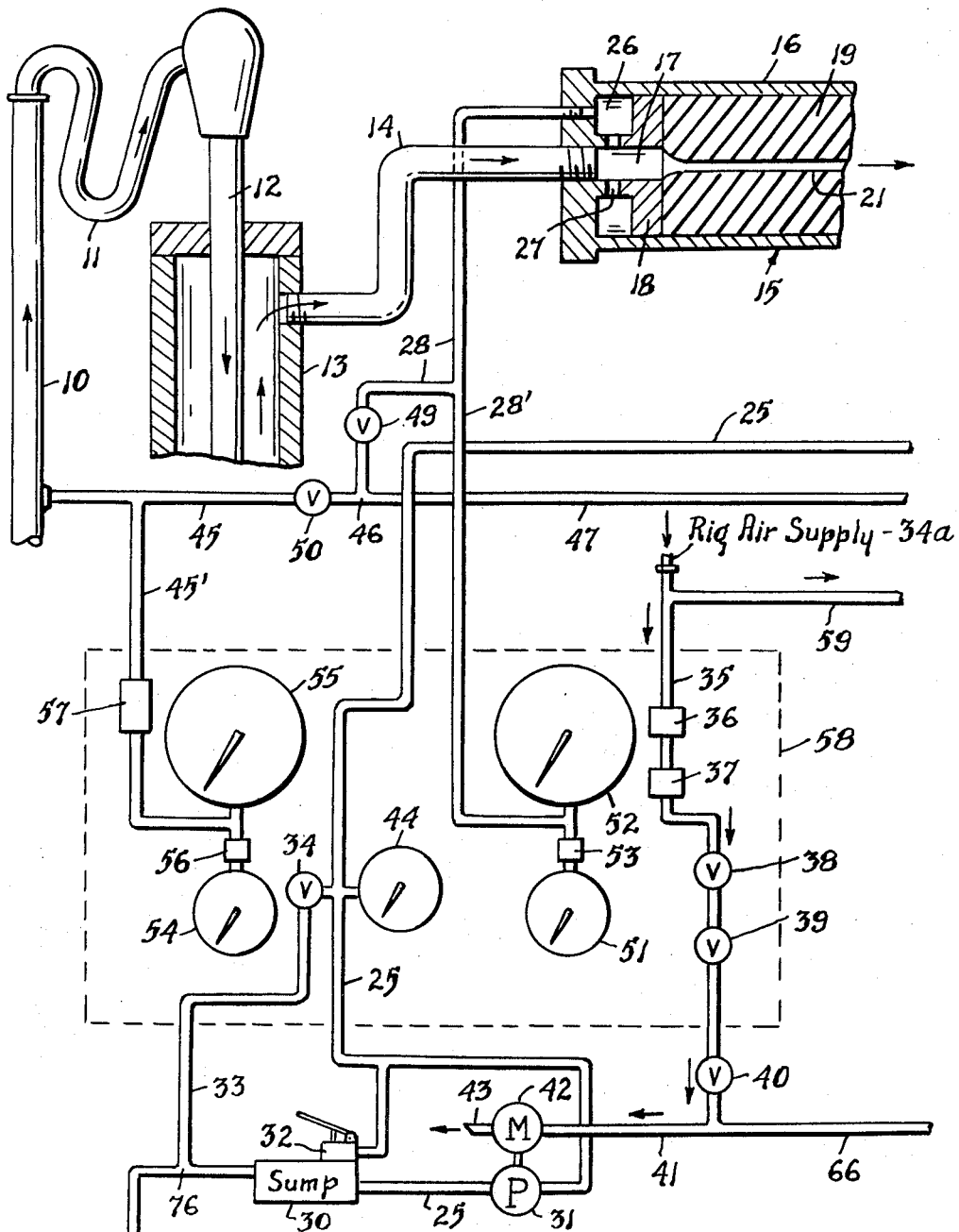
FIG. 2 is a fragmentary diagrammatic view in a more detailed form, of the components appearing at left of the plane indicated by the arrows 2—2 in FIG. 1.
Figure 3:
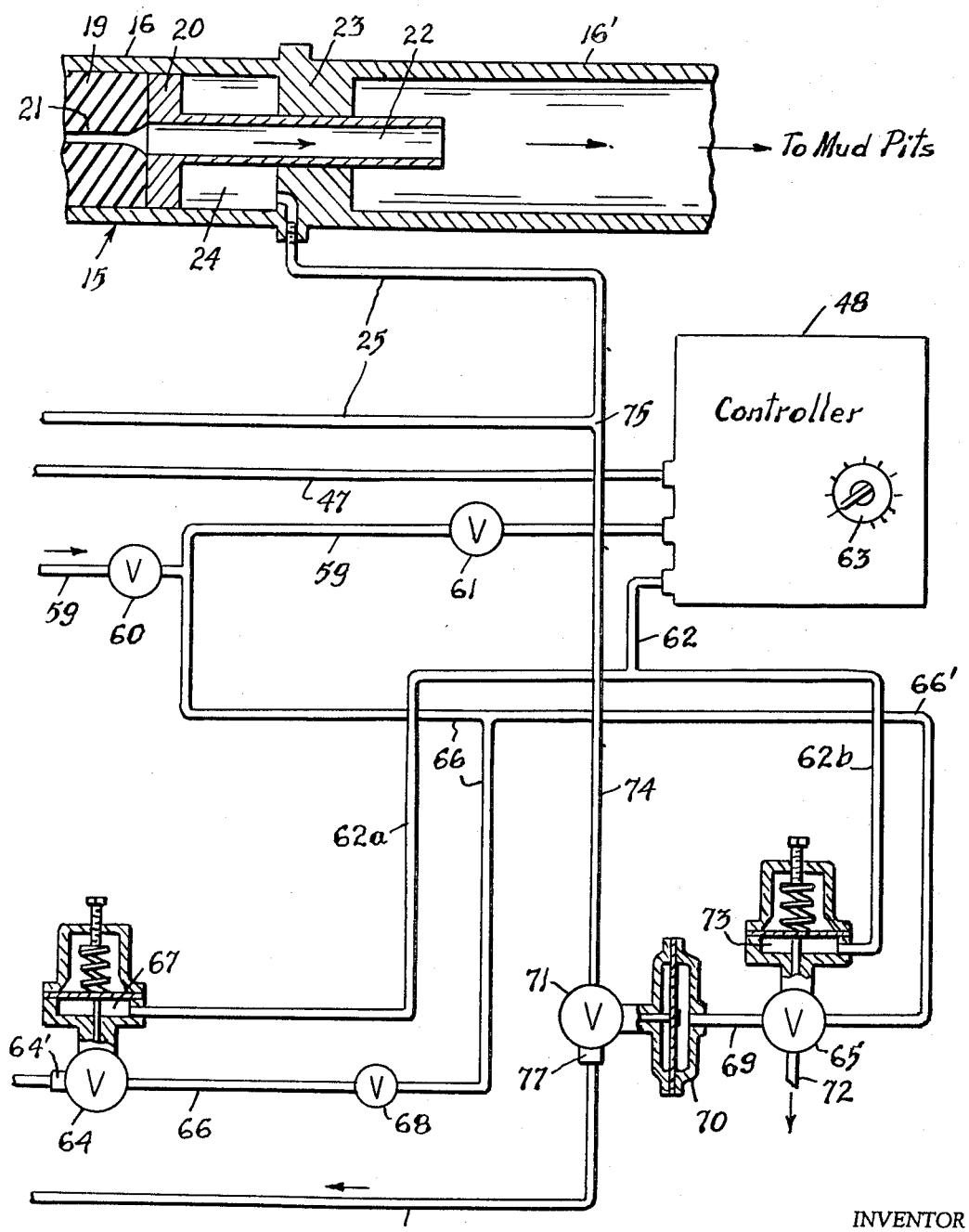
FIG. 3 is a fragmentary diagrammatic view in a more detailed form of the components appearing to the right of the plane indicated by the line 3—3 in FIG. 1.

Referring now to the accompanying drawings in detail, the numeral 10 designates a well standpipe connected by a hose 11 to a drill stem 12 in a well casing 13, the mud flow from the standpipe passing downwardly through the stem 12 to the bottom of the hole and then upwardly in the casing 13, as indicated by arrows. From the casing 13 the mud flows through a line 14 to the pits, and a variable choke 15 is provided in the line 14 to throttle the flow of mud.

The choke 15 may be of any suitable type, but for illustrative purposes the drawings in a more-or-less diagrammatical form show a hydraulically actuated variable choke of the general type disclosed in the aforementioned application Ser. No. 524,061 filed Feb. 1, 1966 by Phil H. Griffin III. As such, the choke 15 includes a housing 16 provided at one end thereof with a mud inlet 17 in communication with the mud line 14. The inlet 17 extends through a fixed abutment member 18 of a resilient valve member 19, the other end of the valve member 19 being provided with a piston-like member 20 which is slidable in the housing 16. The resilient valve member 19 is provided with a choke passage 21 communicating with the mud inlet 17 and also with a mud outlet tube 22, the latter being connected to the member 20 and passing slidably through a partition 23 in the housing for discharging mud into a housing extension 16' from which the mud then flows to the pits. A chamber 24 exists between the member 20 and the partition 23 and a line 25 is provided for delivering hydraulic fluid under pressure into the chamber 24, where such fluid causes sliding of the member 20 toward the inlet end of the housing 16 and resultant axial compression of the resilient valve member 19. It will be apparent that as the member 19 is compressed, the mud passage 21 will become more restricted and throttling of the mud flow will result. Conversely, when fluid pressure in the chamber 24 is relieved through the line 25, the valve member 19 will expand and faster mud flow will be permitted. The inlet end portion of the housing 16 is provided with an annular chamber 26 which communicates with the inlet 17 through openings 27, so that mud passing through the inlet may also fill the chamber 26. A line 28 communicates with the chamber 26 for a purpose hereinafter described.

The present invention concerns itself with apparatus for controlling a hydraulically actuated variable choke of the general type above outlined. As such, the apparatus of the invention provides a manual control as well as an automatic control which is responsive to variations in mud pressure in the well. The manual control will first be described.

The control apparatus comprises a hydraulic system which actuates the choke 15, and a pneumatic system which operates the hydraulic system. The hydraulic system includes a hydraulic fluid reservoir or sump 30, from which the afore-mentioned line 25 extends to the chamber 24 of the choke, a hydraulic pump 31 being provided in the line 25 for delivering fluid under pressure from the sump 30 into the chamber 24 when flow of mud through the choke is to be restricted. If desired, a hand pump 32 may be connected to the line 25 in parallel with the pump 31, so in a manual control the hand pump may be used in substitution for the pump 31 which is motor driven, as hereinafter explained.

A by-pass line 33 is provided between the line 25 downstream from the pumps 31, 32 for returning fluid from the pumps to the sump 30 instead of passing such fluid to the choke 15. A pressure relief valve 34 of a direct spring operated type is provided in the by-pass line 33, and the line 25 does not transmit fluid pressure to the choke 15 unless the relief valve 34 is closed.

The pneumatic system of the apparatus includes a supply of compressed air 34a, such as may be taken from the drilling rig on the order of approximately 100 p.s.i., through an air line 35. After passing through a suitable air filter 36 and an air lubricator 37, the air flows through a maximum pressure regulator 38, where its pressure may be reduced to a maximum of approximately 80 p.s.i. The air then flows through a manually adjustable pressure regulator 39 and through a one-way check valve 40 to a line 41 leading to an air motor 42 which drives the aforementioned hydraulic pump 31 at a faster or slower rate, depending upon the setting of the manually adjustable regulator 39. From the motor 42 the air is exhausted to the atmosphere, as indicated at 43.

When it is desired to manually control actuation of the choke 15, the regulator 39 is set so as to drive the hydraulic pump 31 by the air motor 42 at a speed which produces sufficient fluid pressure in the line 25 to throttle the choke while the relief valve 34 in the by-pass 33 remains closed, the pressure in the fluid line 25 being detectable on a suitable gauge 44 connected to the line 25 as shown, and in the event that the fluid pressure in the line 25 exceeds the setting of the regulator 39, the fluid will open the relief valve 34 and flow back through the by-pass 33 to the sump 30. When the choke 15 is to be opened, the regulator 39 is adjusted so that operation of the motor 42 and pump 31 is discontinued, thus permitting hydraulic fluid pressure at the choke to be relieved.

In addition to the manual control already described, the apparatus of the invention also provides for controlling actuation of the choke automatically in response to variations in mud pressure, either in the standpipe 10 or in the well casing 13. These pressures are sensed selectively through a line 45 connected to the standpipe 10 and through the aforementioned line 28 connected to the choke chamber 26, it being understood that the pressure of mud in the chamber 26 corresponds substantially to the mud pressure in the well casing 13. The lines 28 and 45 join together as at 46 and proceed therefrom as a line 47 to a mud pressure sensing controller 48. The lines 28 and 45 are provided in advance of their junction 46 with hand operated shut-off valves 49, 50, respectively, and when the controller 48 is to sense mud pressure in the standpipe 10 through the line 47, 45, the valve 50 is opened and the valve 49 is closed, thus shutting off the line 28. Alternatively, when the controller is to sense mud pressure in the choke chamber 26 and consequently in the well casing 13, through the line 47, 28, the valve 50 is closed and the valve 49 is opened.

As will be noted, the line 28 is provided with a branch 28' leading to a pair of casing pressure gauges 51, 52. The gauge 51 may be a low pressure reading gauge and the gauge 52 a high pressure reading gauge, say between 0–1000 p.s.i. and 0–5000 p.s.i., respectively, with an automatic block 53 being provided between the two gauges so as to automatically shift pressure from the gauge 51 to the gauge 52 when the pressure reading of the low pressure gauge 51 is exceeded. Similarly, the line 45 is provided with a branch 45' leading to low and high standpipe pressure gauges 54, 55, respectively, with an automatic block 56 therebetween. The line branch 45' may be equipped with a suitable pulse dampener 57 which, along with the several gauges and other control equipment such as the regulators 38, 39, et cetera, may be conveniently mounted on a suitable instrument panel 58, as will be clearly apparent.

The aforementioned controller 48 is of a conventional commercial type which does not require detailed illustration or explanation except to note that it is capable of being connected to a source of compressed air and to provide pneumatic signal impulses of variable pressure in accordance with variable mud pressure sensed, for example, through the sensing line 47. The mud pressure sensing line 47 is connected to the controller 48 as already explained. In addition, a compressed air supply line 59 is connected to the controller, the line 59 joining with the aforementioned air line 35 to receive compressed air from the rig air supply 34a at, say 100 p.s.i. A regulator 60 is provided in the line 59 to reduce the pressure to, say 60–80 p.s.i., followed by a further regulator 61 which reduces the air pressure to approximately 20 p.s.i. before reaching the controller 48. The controller has a pneumatic signal impulse outlet line 62 for delivering air at a pressure varying, say between zero and 15 p.s.i., such impulses being passed by the controller into the line 62 from the air supply line 59. The controller is also provided with a manual adjustment means 63, which may be set so as to provide a variation in the transfer of signal impulses from the air line 59 to the impulse outlet line 62 under different mud pressures sensed through the line 47. The operation of the controller is such that, for example, at a given mud pressure setting of the adjustment means 63, the air signal in the line 62 will have a pressure of, say between zero and 10 p.s.i. when the mud pressure is below the set adjustment, but the air signal will have a pressure of above 10 p.s.i. when the set adjustment is exceeded by the mud pressure.

The signal outlet line 62 has two branches 62a and 62b leading, respectively, to air operated valves 64 and 65. The valve 64 is a two-way valve positioned in a compressed air line 66 which receives air from the air supply line 59 at a pressure of 60–80 p.s.i. set by the regulator 60. After passing through the valve 64, the air travels through the line 66 to the aforementioned line 41 and thence to the air motor 42. The air signal line branch 62a communicates with the diaphragm chamber 67 of the valve 64, the arrangement being such that when the signal pressure in the chamber 67 is below 8 p.s.i., the valve 64 is open, but when such pressure rises above 10 p.s.i., the valve 64 is closed. A needle valve 68 is also provided in the line 66 in advance of the valve 64 and functions as a complete shut off valve, and the valve 64 is equipped at the outlet side thereof with a choke nipple 64' which operates as a constant restriction on the flow of air through the valve 64, regardless of the setting of the needle valve 68.

The valve 65 is a three-way valve provided in a branch 66' extending from the compressed air line 66. In one of its positions, the valve 65 communicates the line 66' with a line 69 leading to the diaphragm chamber of a pneumatic actuator 70 which operates a hydraulic valve 71. In its other position, the valve 65 communicates the line 69 to the atmosphere through a vent 72 while shutting off the line 66', so that air pressure in the diaphragm chamber of the actuator 70 may be relieved. The signal line branch 62b communicates with the diaphragm chamber 73 of the valve 65 and when the signal pressure in the chamber 73 is below 10 p.s.i., the valve 65 admits air through the lines 66' and 69 to the actuator 70 which causes the hydraulic valve 71 to close. On the other hand, when signal pressure in the chamber 73 rises above 8 p.s.i., the valve 65 shuts off the line 66' and communicates the line 69 with the vent 72, thus permitting air to be exhausted from the actuator 70 to open the hydraulic valve 71.

The valve 71 is positioned in a hydraulic fluid by-pass or return line 74 which extends from a junction 75 with the fluid line 25 to a junction 76 with the by-pass line 33 leading to the sump 30. Thus, when the valve 71 is open, fluid delivered by the pump 31 through the line 25 may be returned to the sump 30 without actuating the choke 15, this being possible even when the by-pass line 33 is closed by the pressure relief valve 34. Since the valve 71 is a snap-acting valve, an additional valve 77 is provided to throttle the flow of fluid through the line 74. This throttling relieves fluid pressure from the choke 15, thereby reducing the amount of back pressure maintained by the choke.

The operation of the automatic control apparatus may be summarized as follows:

The adjustment means 63 on the controller 48 is manually set to a selected amount back pressure which the variable choke 15 is desired to place on the flow of mud from the well. Now assuming the valve 50 to be open and the valve 49 closed, the controller 48 will sense the mud pressure in the standpipe 10 through the sensing lines 45, 47, and if the mud pressure in the standpipe exceeds the controller setting at 63, a pneumatic signal of more than 10 p.s.i. will be delivered by the controller 48 through the signal lines 62a, 62b, causing the valve 64 to close and also causing the valve 65 to vent the actuator 70 to the atmosphere, thus opening the fluid return valve 71. This permits fluid to be relieved from the chamber 24 of the choke 15 through the fluid return line 74, so that the choke passage 21 becomes enlarged and mud flow through the choke is increased, with a resultant reduction back pressure against the well.

On the other hand, if the mud pressure in the standpipe decreases below the controller setting at 63, a pneumatic signal of less than 10 p.s.i. will be delivered by the controller 48 to the valves 64, 65, thus causing the valve 65 to deliver air to the actuator 70 for closing the valve 71 and stopping flow of fluid through the return line 74. When the pressure of the signal falls below 8 p.s.i., the valve 64 will be opened, thus delivering compressed air through the lines 66, 41 to the air motor 42 which in turn drives the pump 31, causing fluid to be delivered through the line 25 to the choke chamber 24. This of course, throttles the choke 15, reducing the flow of mud through the choke and increasing the amount of back pressure against the well.

It will be apparent from the foregoing that a desired amount of mud back pressure may thus be automatically held, by simply setting the controller adjustment 63 to the back pressure desired.

It may be noted that when the automatic control rather than the manual control is used, the regulator 39 is adjusted so that there is no air flow through the line 35 to the motor 42 and, in the absence of operation of the pump 31, the relief valve 34 remains fully closed. The motor 42 is driven by air passing through the lines 66, 41 only when the valve 64 is open, and if excessive fluid pressure should be generated by the pump 31 when the fluid return line 74 is closed by the valve 71, such pressure may be relieved through the valve 34 and by-pass 33 to the sump 30.

The control apparatus of the invention is capable of efficiently actuating the variable choke as dictated by varying pressures of mud in the well. An example may be given of an instance where foreign fluid such as water or gas has invaded the mud column and an unstable condition exists so that a possible blow-out is threatening. Since foreign fluid has entered the bore hole, the mud pits will show a gain and blow-out preventers are closed. The formation will continue to produce until the formation and bore hole pressures are equal. The sum of the pressures in the drill pipe must be equal to the sum of the pressures in the casing, and the sum of either is equal to the bottom hole pressure. While circulating out the foreign fluid, the sum of pressures in the drill pipe must be equal to or slightly greater than the bottom hole pressure to contain any further invasion of foreign fluid. As long as circulation of the mud is not reversed, the drill pipe cannot be contaminated by foreign fluids, thus providing means for calculating conditions in the well.

Drilling personnel are faced with the problem of pumping the foreign fluid to the surface. There is a general consensus that the pit level should be held constant, thus not allowing gas expansion in the casing, which is in error. If the foreign fluid were water, this would be correct, but if the fluid is gas, it must be allowed to expand. If not, the gas will maintain the same pressure at the surface as it had at bottom depth and the pressure in the casing at bottom depth would double, thus breaking down the formation. Since the gas must be permitted to expand, this means more mud emerging from the casing than is entering the drill pipe. However, this does not necessarily reduce the bottom hole pressure.

As circulation progresses, changes will occur in the casing pressure because of gas expansion, with the majority of expansion taking place near the surface of the hole. If circulation rate and drill pipe pressures are held constant, the bottom hole pressure will remain constant even though there will be a gain in volume from the casing.

For the initial pumping out, the choke opening and circulating rate are quickly adjusted to give a choke pressure of approximately 100 p.s.i. in excess of the shut-in casing gauge pressure. The automatic control of the invention is then cut in to sense the constant drill pipe pressure and control the same. The annulus is allowed to seek its own pressure and the control is placed on the drill pipe pressure only.

The combination of the hydraulic system to actuate the choke and the pneumatic system to operate the hydraulic system, has many advantages, especially in conjunction with the snap-acting high pressure needle valve at the outlet, instead of a throttling valve, for restricting the flow at any desired setting of the control.

After experimentation it was found that the drilling system controlled had an internal time lag which could not be eliminated due to the nature of the operation being performed. For example, the drill pipe pressure drops by 100 p.s.i., and the controller makes the choke close enough to compensate for the 100 p.s.i. change. After closure, the pressure wave travels from the choke down the casing and up the drill pipe. Meanwhile, during the time required for the pressure wave to reach the drill pipe, the drill pipe is constantly sending a signal for the choke to close, thereby making the choke close too far. An undesirable time lag is the cause of this event, so a high pressure needle valve in the hydraulic system and a choke nipple in the pneumatic system are used to slow down the reaction time and thus compensate for the internal time lag.

While in the foregoing there has been shown and described the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

I claim:

1. A control for a choke having means responsive to hydraulic pressure for varying its orifice in a drilling mud flow line from a well, said control comprising a hydraulic system for actuating said hydraulic pressure responsive means and a pneumatic system for operating said hydraulic system, the hydraulic system including a fluid reservoir, a pump for delivering fluid under pressure from said reservoir to said hydraulic pressure responsive means, a by-pass for returning fluid from said pump to the reservoir, and a normally closed fluid pressure responsive relief valve provided in said by-pass, said pneumatic system including a compressed air supply, a compressed air motor connected to said air supply and drivingly connected to said pump, and a manually adjustable regulator between said air supply and said air motor for controlling the supply of compressed air to said motor, whereby to control the hydraulic fluid pressure delivered by said pump.

2. The apparatus as defined in claim 1 together with automatic means for controlling the supply of compressed air to said motor independently of said manually adjustable regulator and in response to variations of mud pressure in the well, said automatic means delivering air to said motor in response to a first mud pressure and stopping flow of air to said motor in response to a second higher mud pressure.

3. The apparatus as defined in claim 2 wherein said automatic means include a manually adjustable mud pressure responsive controller connected to said pneumatic system and adapted to provide pneumatic signal impulses when mud pressure falls below or rises above a predetermined controller setting, and a compressed air supply control valve responsive to said signal impulses and connected to said motor.

4. The apparatus as defined in claim 3 wherein said automatic means also include a second by-pass in said hydraulic system for returning fluid from said pump to said reservoir independently of the first mentioned by-pass, and a fluid return control valve provided in said second by-pass and responsive to signal impulses from said controller.

5. The apparatus as defined in claim 4 wherein said compressed air supply control valve and said fluid return control valve are respectively opened and closed and closed and opened when the mud pressure respectively falls below and rises above a predetermined setting of said controller.

6. The apparatus as defined in claim 4 wherein said fluid return control valve is air operated, together with air valve means responsive to signal impulses from said controller for selectively delivering compressed air to said fluid return control valve and venting the same to the atmosphere.

7. The apparatus as defined in claim 3 wherein said controller includes sensing means responsive to pressure of mud in a casing located in said well.

8. The apparatus as defined in claim 3 wherein said controller includes sensing means responsive to pressure of mud in a standpipe located in said well.

9. The apparatus as defined in claim 3 wherein said controller includes sensing means responsive selectively to mud pressure in a casing and a standpipe located in said well.

10. The apparatus as defined in claim 3 wherein said compressed air supply control valve includes a valve portion in line between the compressed air supply and said motor, and an air operated actuator for said valve portion connected to said controller.

11. An automatic control for a choke having means responsive to hydraulic pressure for varying its orifice in a drilling mud flow line from a well, said control comprising a hydraulic system for actuating said hydraulic pressure responsive means and a pneumatic system for operating said hydraulic system, the hydraulic system including a fluid reservoir, a pump for delivering fluid under pressure from said reservoir to said hydraulic pressure responsive means, a by-pass for returning fluid from said pump to the reservoir, and a fluid return control valve provided in said by-pass, said pneumatic system including a compressed air supply, a compressed air motor driving said pump, a compressed air supply control valve connected to said motor, and a manually adjustable controller responsive to mud pressure in the well, said controller being adapted to provide pneumatic signal impulses when the mud pressure falls below or rises above a predetermined controller setting, said fluid return control valve and said compressed air supply control valve being responsive to signal impulses from said controller, whereby the compressed air supply control valve and said fluid return control valve are respectively opened and closed and closed and opened when the mud pressure respectively falls below and rises above a predetermined setting of said controller.

12. The apparatus as defined in claim 11 wherein said fluid return control valve is air operated, together with air valve means responsive to signal impulses from said controller for selectively delivering compressed air to said fluid return control valve and venting the same to the atmosphere.

13. The apparatus as defined in claim 11 wherein said compressed air supply control valve includes a valve portion in line between the compressed air supply and said motor, and an air operated actuator for said valve portion connected to said controller.

14. The apparatus as defined in claim 11 wherein said controller includes sensing means responsive selectively to mud pressure in a casing and in a standpipe located in said well.

References Cited

UNITED STATES PATENTS

| | | | |
|---|---|---|---|
| 1,699,227 | 1/1929 | Craddock | 138—46 X |
| 1,850,423 | 3/1932 | Taylor et al. | |
| 2,425,193 | 8/1947 | Lehr | 175—217 X |
| 2,590,215 | 3/1952 | Sausa | 138—45 |
| 2,592,836 | 4/1952 | Weber | 103—11 |
| 2,786,652 | 3/1957 | Wells | 175—38 X |
| 3,213,939 | 10/1965 | Records | 175—38 X |
| 3,316,936 | 5/1967 | Gongwer | 251—5 X |

OTHER REFERENCES

Records, L. R., et al., *New Well-Control Unit Speeds Safer Handling of Blowouts*. In Oil & Gas Journal, Sept. 10, 1962, pp. 106–116. (Copy in 175–25.)

CHARLES E. O'CONNELL, *Primary Examiner.*

IAN A. CALVERT, *Assistant Examiner.*